(12) United States Patent
Drachmann Haag

(10) Patent No.: US 10,954,916 B2
(45) Date of Patent: Mar. 23, 2021

(54) WIND TURBINE BLADE WITH ANCHORING SITES

(71) Applicant: LM WP PATENT HOLDING A/S, Kolding (DK)

(72) Inventor: Michael Drachmann Haag, Esbjerg (DK)

(73) Assignee: LM WP PATENT HOLDING A/S, Kolding (DK)

( * ) Notice: Subject to any disclaimer, the term of this patent is extended or adjusted under 35 U.S.C. 154(b) by 0 days.

(21) Appl. No.: 15/745,222

(22) PCT Filed: Jul. 17, 2015

(86) PCT No.: PCT/EP2015/066398
§ 371 (c)(1),
(2) Date: Jan. 16, 2018

(87) PCT Pub. No.: WO2017/012633
PCT Pub. Date: Jan. 26, 2017

(65) Prior Publication Data
US 2018/0230966 A1    Aug. 16, 2018

(51) Int. Cl.
| | |
|---|---|
| *B29C 65/50* | (2006.01) |
| *F03D 1/06* | (2006.01) |
| *B29C 65/08* | (2006.01) |
| *B29C 65/10* | (2006.01) |
| *B29C 65/16* | (2006.01) |
| *B29C 65/00* | (2006.01) |

(Continued)

(52) U.S. Cl.
CPC ............ *F03D 1/0675* (2013.01); *B29C 65/08* (2013.01); *B29C 65/10* (2013.01); *B29C 65/16* (2013.01); *B29C 65/5057* (2013.01); *B29C 66/721* (2013.01); *B29D 99/0025* (2013.01); *B29C 65/02* (2013.01); *B29C 65/0681* (2013.01); *B29C 65/1635* (2013.01);

(Continued)

(58) Field of Classification Search
CPC ... F03D 1/0675; B29D 99/0025; B29D 65/08; B29D 66/721; B29D 65/4895; B29D 66/532; B29D 66/54; B29D 65/1677; B29D 65/66; B29D 65/73941; B29D 65/4815; B29D 65/48; B29D 66/1142; B29D 66/1162; F05B 2280/4007
USPC .......................................................... 416/224
See application file for complete search history.

(56) References Cited

U.S. PATENT DOCUMENTS

| | | | |
|---|---|---|---|
| 5,088,665 A * | 2/1992 | Vijgen | B64C 23/06 244/198 |
| 8,162,590 B2 * | 4/2012 | Haag | F03D 1/0633 415/4.3 |

(Continued)

FOREIGN PATENT DOCUMENTS

| | | |
|---|---|---|
| WO | 2006122547 A1 | 11/2006 |
| WO | 2015/015202 A1 | 2/2015 |

OTHER PUBLICATIONS

TWI global, Welding techniques for thermoplastics, Mar. 26, 2014, TWI (Year: 2014).*
LM Wind Power Rotor Blades Features.

*Primary Examiner* — J. Todd Newton
*Assistant Examiner* — Andrew J Marien
(74) *Attorney, Agent, or Firm* — Nath, Goldberg & Meyer; Jerald L. Meyer; Tanya E. Harkins

(57) ABSTRACT

The invention relates to a wind turbine blade having integrated thermoplastic anchoring sites for attachment of surface mounted devices, a method for producing such blade and a wind turbine equipped with such blade.

19 Claims, 5 Drawing Sheets

(51) Int. Cl.
*B29D 99/00* (2010.01)
*B29L 31/08* (2006.01)
*B29C 65/48* (2006.01)
*B29C 65/06* (2006.01)
*B29C 65/02* (2006.01)
*B29C 65/18* (2006.01)

(52) U.S. Cl.
CPC .......... *B29C 65/1677* (2013.01); *B29C 65/18* (2013.01); *B29C 65/48* (2013.01); *B29C 65/4815* (2013.01); *B29C 65/4895* (2013.01); *B29C 66/1142* (2013.01); *B29C 66/1162* (2013.01); *B29C 66/301* (2013.01); *B29C 66/532* (2013.01); *B29C 66/54* (2013.01); *B29C 66/71* (2013.01); *B29C 66/73941* (2013.01); *B29L 2031/085* (2013.01); *F05B 2240/2211* (2013.01); *F05B 2250/70* (2013.01); *F05B 2280/4007* (2013.01); *F05B 2280/6003* (2013.01); *Y02E 10/72* (2013.01); *Y02P 70/50* (2015.11)

(56) References Cited

U.S. PATENT DOCUMENTS

| | | | |
|---|---|---|---|
| 8,961,142 B2 * | 2/2015 | Wansink | F03D 1/0675 416/224 |
| 9,890,764 B2 * | 2/2018 | Pal | F03D 1/0675 |
| 2003/0099546 A1 * | 5/2003 | Stiesdal | F03D 1/0641 416/228 |
| 2007/0140858 A1 * | 6/2007 | Bakhuis | F03D 1/0675 416/223 R |
| 2009/0074585 A1 * | 3/2009 | Koegler | F03D 1/0675 416/228 |
| 2011/0042524 A1 * | 2/2011 | Hemmelgarn | B64C 3/48 244/203 |
| 2011/0142668 A1 * | 6/2011 | Rao | F03D 1/0675 416/229 R |
| 2011/0142678 A1 * | 6/2011 | Santiago | F03D 1/0675 416/241 R |
| 2012/0034094 A1 * | 2/2012 | Wansink | B29D 99/0025 416/230 |
| 2012/0057984 A1 * | 3/2012 | Fuglsang | F03D 1/0641 416/234 |
| 2012/0156049 A1 * | 6/2012 | Hong | B23P 6/007 416/224 |
| 2012/0257979 A1 * | 10/2012 | Jensen | F03D 1/0608 416/223 R |
| 2014/0010961 A1 * | 1/2014 | Sorondo Zabala | F03D 1/0675 427/290 |
| 2014/0093382 A1 * | 4/2014 | Fuglsang | F03D 1/0641 416/236 R |
| 2016/0215757 A1 * | 7/2016 | Behmer | B29C 70/086 |
| 2017/0058863 A1 * | 3/2017 | Yarbrough | F03D 1/0675 |

* cited by examiner

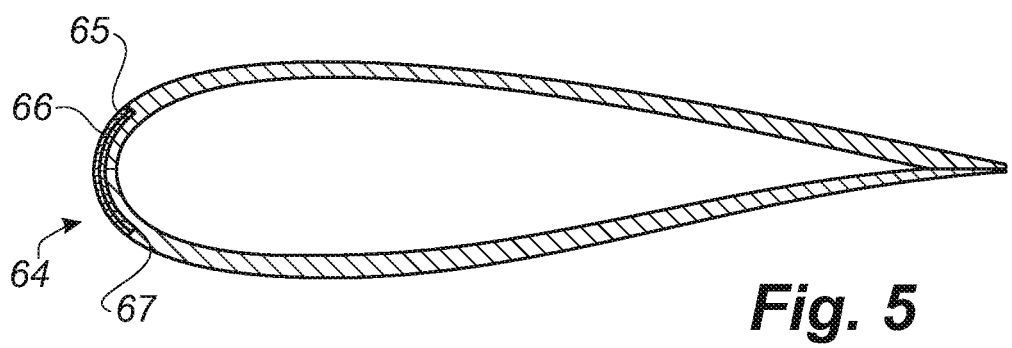
Fig. 5
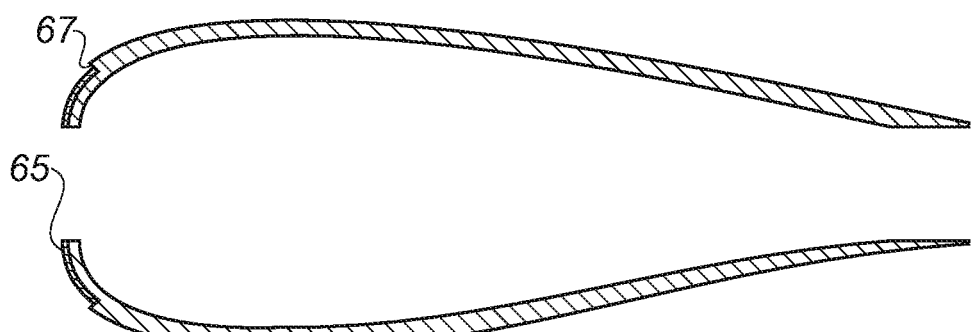
Fig. 6
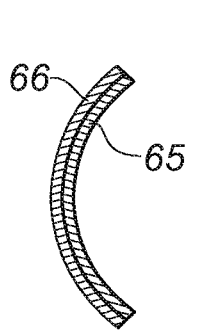 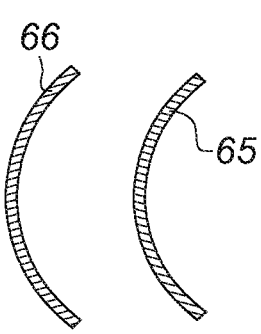 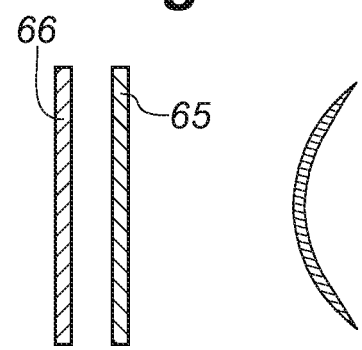
Fig. 7   Fig. 8   Fig. 9   Fig. 10
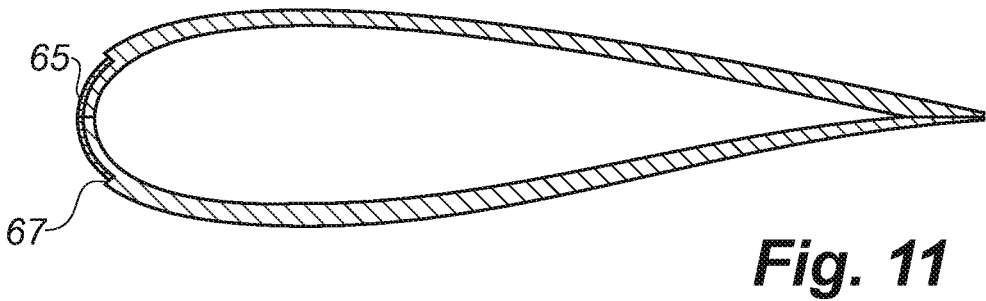
Fig. 11

WIND TURBINE BLADE WITH ANCHORING SITES

This is a National Phase Application filed under 35 U.S.C. 371 as a national stage of PCT/EP2015/066398, filed Jul. 17, 2015, the content of each of which is hereby incorporated by reference in its entirety.

FIELD OF THE INVENTION

The present invention relates to a wind turbine blade, a wind turbine having such blade and a method of manufacturing such blade.

BACKGROUND OF THE INVENTION

Modern wind turbine blades may require surface mounted devices, also known as add-ons, attached to the aerodynamic shell of the blade.

Such add-ons are typically adhered to the aerodynamic shell of the blade at various positions by using different types of adhesives or double sided tape.

WO 13 060493 describes vortex generators fixed to a wind turbine blade by using adhesives.

It is thus known to adhesively attach various components such as spoilers and serrations to wind turbine blades.

One problem in this regard is that such add-ons may fall of the blade during operation or may loosen over time which may cause a drop in blade performance with regard to energy generation, operational noise and safety.

This in turn causes costly down time and repairs.

It is an objective of the present invention to lessen or ameliorate such problems.

SUMMARY OF THE INVENTION

The invention pertains to a wind turbine blade having a blade shell body made of a composite material,
said composite material comprising reinforcement fibers and a thermoset resin,
said wind turbine blade comprising a tip end and a root end, as well as a leading edge and a trailing edge,
said wind turbine blade comprising a thermoplastic material integrated in the shell body,
said thermoplastic material being comprised in at least a part of the outer surface of the wind turbine blade,
said thermoplastic material being configured to act as anchoring site for attachment of at least one additional surface mounted device.

According to the present invention, a wind turbine blade with anchoring sites for attachment of surface mounted devices is provided. The anchoring sites of thermoplastic material allow for easier and safer attachment of devices to the surface of the blade. The thermoplastic material of the anchoring site may be chosen to provide improved conditions for bonding to such surface mounted devices. Furthermore, the thermoplastic material for the anchoring sites may be selected to provide good integration with the fibre reinforced material of the shell body. It may be advantageous to have good adhesion between the thermoset resin used and the thermoplastic material of the anchoring site.

The device for surface mounting no longer needs to be bonded to the composite material of the shell body which may often be difficult and not always reproducible with the risk of detachment of surface mounted devices from the blade during use. Enhanced attachment of devices via the anchoring sites integrated in the shell body of the wind turbine blade according to the invention may result in longer lifetime and less service related to the devices.

The thermoplastic anchoring sites integrated in the shell body of the blade at suitable positions may also provide visible aid for identifying where to attach a device. For example, the anchoring site may have a different colour or texture when compared to the shell body material, making it easy to identify the anchoring site.

According to embodiments of the invention, surface mounted devices typically may be used to modify the aerodynamic performance of the wind turbine blade.

According to embodiments of the invention, the thermoplastic anchoring sites may be used for attachment of an erosion shield, for example, along at least a part of the leading edge of the wind turbine blade.

In an embodiment of the invention the thermoplastic material comprises chemical groups capable of reacting with components of the thermosetting resin.

According to embodiments of the invention it is advantageous to select the thermoplastic material to be able to chemically bond to components of the thermoset resin by chemical reaction between, for example, chemical groups in the polymer backbone of the thermoplastic material and rein components, for example, crosslinking components and/or monomers, oligomers or polymers comprised in the resin mixture.

For example, such chemical bonding may according to embodiments of the invention be achieved by selecting poly(acrylonitrile butadiene styrene) as the thermoplastic material and a polyester resin mixture comprising styrene as a reactive solvent and crosslinking component. The styrene-groups of the thermoplastic polymer may then react with resin components and become chemically bonded to the resin. Thereby a very durable integration of the anchoring site in the shell bode may be achieved.

In an embodiment of the invention the wind turbine blade further comprises at least one surface mounted device attached to the anchoring site of the wind turbine blade.

The wind turbine blade may according to these embodiments be provided with surface mounted devices attached to the anchoring sites.

In an embodiment of the invention said at least one surface mounted device is attached to the wind turbine blade at said anchoring site by gluing, plastic welding or a combination thereof.

The thermoplastic material used for the attachment site may be selected depending on the method of attaching the surface mounted device. Accordingly, in some embodiments of the invention the thermoplastic material is particularly suitable for use with adhesive bonding methods, while in alternative embodiments, the thermoplastic material at the anchoring site may be suitable for plastic welding. Some thermoplastic materials may be suitable for a combination of gluing and welding.

In an embodiment of the invention said plastic welding is selected from laser welding, thermal welding, such as hot gas welding, speed tip welding, spot welding, contact welding and hot plate welding, ultrasonic welding, high frequency welding and solvent welding.

When the surface mounted device is made from a thermoplastic material, using a plastic welding process for joining the surface mounted device to the thermoplastic material at the anchoring site and thereby, to the surface of a wind turbine blade, has multiple advantages:

The welding process may be automated or semi-automated, which may reduce production costs and improve reproducibility and quality.

The bond established between device and anchoring site corresponds to an entanglement of the polymeric chains of the two materials at the interface, making the bond extremely durable and very unlikely to fail during operation of the blade.

The process and the quality of the established material connection are more or less independent of the environment on the site of welding. At the blade manufacturing site, careful control of temperature and relative humidity, usually important when using, for example, adhesives, tapes and the like, may not be necessary. Furthermore, a damaged or worn surface mounted device may be replaced on site while the blade is on the wind turbine or at least without moving the blade into a controlled environment.

In principle, any welding process suitable for welding plastic materials may be used according to embodiments of the invention.

In preferred embodiments heat welding is utilized.

Hot gas welding is one possible method applicable according to embodiments of the invention. Hot gas welding may be both versatile and economic.

Laser welding may also be used, because it produces very reproducible results with a variety of thermoplastic materials. Laser welding may be automated and can also be adapted for use on site in the field.

Thereby, very reproducible joints may be obtained, even when conditions are not easy to control.

Laser welding typically requires the thermoplastic material at the anchoring site to absorb energy at the laser wavelength, while the thermoplastic material used for the surface mounted device should let the laser wavelength pass through at least partly to reach the interface between the two materials. If the surface mounted device and the anchoring site are in close contact, the laser transparent material is also heated at the interface by conduction and a very durable joint is formed.

Close contact between the thermoplastic materials may be established, for example, by using a clamping device to fix the surface mounted device to the anchoring site during the laser welding process.

In some embodiments, the thermoplastic material at the anchoring site comprises heat absorbing means, for example carbon black, other special pigmentation or other additives.

In an embodiment of the invention the thermoplastic material is provided in the form of sheets, foils or strips.

The thermoplastic material for the anchoring site may be flexible enough to be able to adapt to the required shape of the shell body or part of the shell body required at the anchoring site. This may be obtained by using sheets or foils that can follow the shape of the mould surface in the moulding process for producing the shell body which may involve vacuum assisted resin transfer.

It may be advantageous to heat the foil, sheet or strip to a temperature at which the thermoplastic material softens slightly to assist positioning of the foil or sheet in the mould.

In an embodiment of the invention the thermoplastic material has a thickness of between 0.1 and 2.0 mm, preferably between 0.2 and 1.0 mm.

The thickness of the sheet, foil or strip of the thermoplastic material used for the anchoring site may vary. A certain thickness is required to achieve a suitable and well-functioning base material unto which a surface mounted device may be attached, for example by plastic welding. If the thickness becomes too great, flexibility may be impaired and material costs go up.

In an embodiment of the invention the at least one surface mounted device is a part having serrations, a spoiler, a vortex generator, a winglet, a tip section, a Guerney flap, a stall fence or any combinations thereof.

Any type of surface mounted device may be attached to the wind turbine blade at the anchoring site. These devices typically modify the aerodynamic performance of the blade. For example, serration parts, typically mounted at the trailing edge of the blade, may help reducing the noise generated by the wind turbine blade during rotation, while vortex generators may prevent detachment of the airflow around the air foil of the blade, thereby enhancing the generated lift.

In an embodiment of the invention the at least one surface mounted device is an injection moulded plastic part.

Typically the surface mounted devices require a detailed and accurate geometry. They may in preferred embodiments be made of thermoplastics by injection moulding.

In an embodiment of the invention the thermoplastic material is selected from the group consisting of polystyrene, poly(acrylonitrile butadiene styrene), poly(acrylonitrile styrene acrylate), poly(styrene acrylonitrile), polycarbonate, polyether ether ketone, polybutylene terephthalate or any combination thereof.

A number of the thermoplastic materials may be used for the anchoring sites. In a preferred embodiment of the invention, poly(acrylonitrile butadiene styrene) forms the thermoplastic material. In this case, very good integration of the thermoplastic material with the thermoset resin and the fibre reinforcement in the shell body may be achieved, especially when using polyester resin as the thermoset resin.

In an embodiment of the invention the at least one surface mounted device is made of polystyrene, poly(acrylonitrile butadiene styrene), poly(acrylonitrile styrene acrylate), poly(styrene acrylonitrile), polycarbonate, polyether ether ketone, polybutylene terephthalate, ultra-high density polyethylene, thermoplastic elastomer, such as thermoplastic polyurethane or any combination thereof.

The material selected for the surface mounted device is selected to make possible good bonding to the anchoring site and may also be chosen with respect to good erosion resistance.

In an embodiment of the invention the thermoplastic material is selected from the group consisting of poly (acrylonitrile butadiene styrene), polycarbonate, blends of poly(acrylonitrile butadiene styrene) and polycarbonate, and combinations thereof and the at least one surface mounted device is made of polycarbonate, blends of poly(acrylonitrile butadiene styrene) and polycarbonate, thermoplastic polyurethane and combinations thereof.

According to these embodiments, several combinations of anchoring site thermoplastic material and surface mounted device thermoplastic material are possible.

For example, poly(acrylonitrile butadiene styrene) as the anchoring site thermoplastic material may useful when attaching a surface mounted device mad of a blend of poly(acrylonitrile butadiene styrene) and polycarbonate.

When poly(acrylonitrile butadiene styrene) is used as the anchoring site thermoplastic material and the surface mounted device is made of polycarbonate a further embodiment of the present invention has been obtained.

When a blend of poly(acrylonitrile butadiene styrene) and polycarbonate is used as the anchoring site thermoplastic material and the surface mounted device is made of thermoplastic polyurethane, another embodiment of the present invention has been obtained.

When poly(acrylonitrile butadiene styrene) is used as the anchoring site thermoplastic material and the surface mounted device is made of a blend of poly(acrylonitrile butadiene styrene) and polycarbonate, a further embodiment of the present invention has been obtained.

In principle, the materials used for the anchoring site and for the surface mounted device may both be of the same type, for example, polycarbonate.

According to an embodiment of the invention a recess is present on top of the thermoplastic material, said recess having a depth adapted for accommodation of the at least one surface mounted device, whereby the base part of the at least one surface mounted device on the surface of the wind turbine blade is substantially flush with the adjacent surface of the wind turbine blade.

It may be aerodynamically favourable to have the base of the surface mounted device being flush with the wind turbine blade surface. This may, for example, be obtained by placing the erosion shield in a recess adapted for accommodating it.

Such recess may be established, for example, by first placing a low surface energy material such as silicone rubber in the mould for moulding the blade shell body, before placing the thermoplastic material in the mould on top of the low surface energy material. After moulding the low surface energy material is removed and leaves a recess for attaching the surface mounted device.

The low surface energy material may be chosen to substantially match the thickness of the base of the surface mounted device.

The invention further pertains to a wind turbine comprising a blade as described herein.

The invention also pertains to a method of manufacturing a wind turbine blade, said blade for a wind turbine having a blade shell body made of a composite material in a moulding process, said composite material comprising reinforcement fibers and a thermoset resin, said wind turbine blade comprising a tip end and a root end, as well as a leading edge and a trailing edge, said method comprising the steps of
placing a thermoplastic material in a mould for moulding at least a part of the blade shell body,
said thermoplastic material being placed in the mould to form an anchoring site integrated at the surface of the blade shell body for attachment of at least one additional surface mounted device,
placing reinforcement fibers in the mould,
wetting the thermoplastic material and the reinforcement fibers with a thermoset resin, and
curing said resin to form at least a part of the shell body, optionally joining shell body parts to form a shell body.

In an embodiment of the invention said method further comprising the step of
attaching the additional surface mounted device at the anchoring site.

In an embodiment of the invention the additional surface mounted device is attached by gluing, plastic welding or a combination thereof.

In an embodiment of the invention said attaching the additional surface mounted device is performed on site while the wind turbine blade is mounted on a wind turbine or the wind turbine blade has been detached from the wind turbine for servicing.

Maintenance of wind turbines is typically costly and involves undesirable down time where no energy is produced.

Wind turbine blades may also require maintenance, one reason for this being replacement or attachment of surface mounted devices. The method according to the present embodiments is surprisingly well suited for on-site repair, replacement or post-mounting of surface mounted devices as herein described.

This is because the anchoring site may be completely intact for attachment of a new device, for example, after the originally mounted device has been damaged by erosion or other failure. Removal of remnants of the original device allows for easy attachment of a new similar device.

Alternatively, when aerodynamic modifications are needed on a blade according to the invention already in service on a wind turbine, the integrated anchoring sites at the blade surface may be used for attaching the required surface mounted devices.

Typically, use of adhesives to attach surface mounted devices, for example, use of tapes, would benefit from controlled humidity and temperature to secure good bonding and also require great skills and cleanliness.

Such control is often not possible at all or only to a sub-optimal extent if a repair or a new attachment of a device is made on-site. Having dedicated attachment sites integrated in the blade may lessen the need for such control.

Furthermore, if for example using plastic welding such as, for example, laser welding is used for attaching the surface mounted devise to the anchoring site, this does not require a special climate, but may be applied while the blade is mounted on the turbine. This allows repairs and replacements all year as opposed to other methods being applicable only during summer at appropriate temperatures.

DETAILED DESCRIPTION

The invention is explained in detail below with reference to an embodiment shown in the drawings, in which FIG. 1 shows a wind turbine, FIG. 2 shows a schematic view of a wind turbine blade according to the invention, FIG. 3 shows a schematic view of an airfoil profile, FIG. 4 shows a schematic view of the wind turbine blade according to the invention, seen from above and from the side, FIG. 5 shows a schematic view of an airfoil profile having an erosion shield comprised of two layers of thermoplastic materials at the leading edge, FIG. 6 shows a schematic view of an airfoil profile of two shell body parts having an integrated first thermoplastic material in a recess at the leading edge, FIG. 7 shows a schematic view of an erosion shield comprised of 2 layers of thermoplastic materials joined together.

FIG. 8 shows a schematic view of pre-formed parts of a first—and a second thermoplastic material, respectively.

FIG. 9 shows a schematic view of two sheets/foils of a first—and a second thermoplastic material, respectively.

Figure 2:
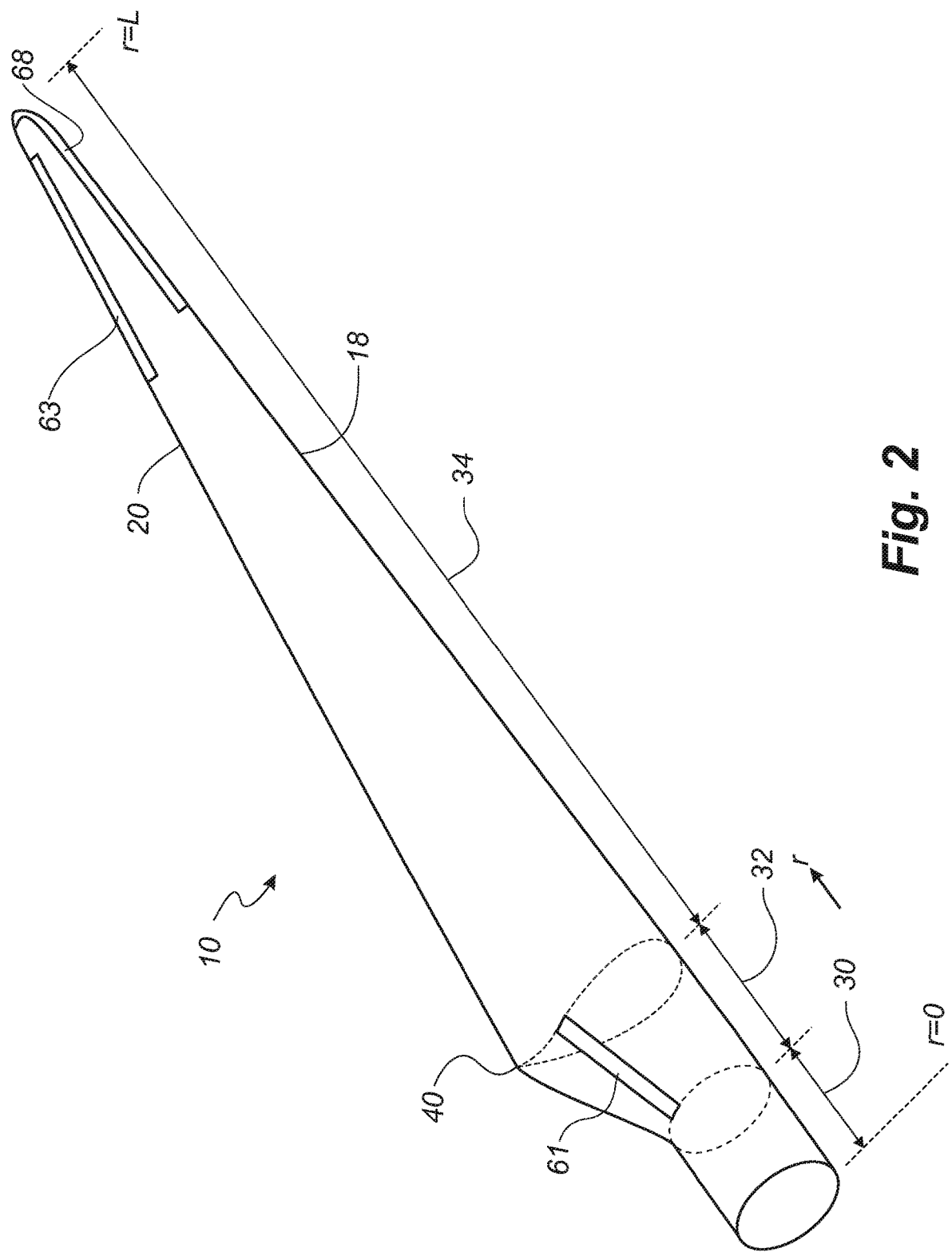
Figure 12:
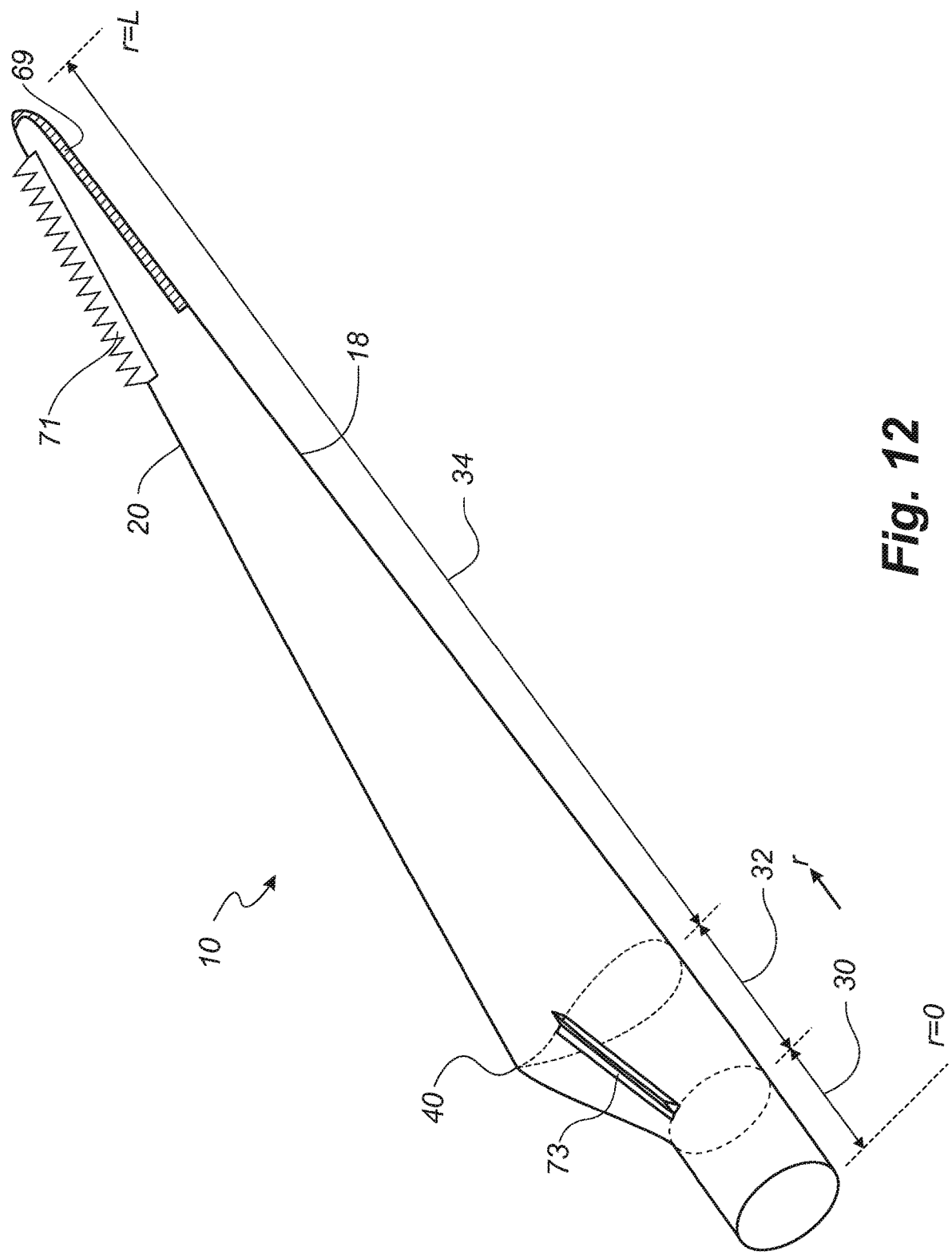

FIG. 10 shows a schematic view of a pre-formed part of thermoplastic material, the part being thinner at the ends than in the middle, FIG. 11 shows a schematic view of an airfoil profile corresponding to the joining of the two shell body parts of FIG. 5, FIG. 12 shows a schematic view of a wind turbine blade with an erosion shield, serrations and a spoiler attached to the blade of FIG. 2 at the anchoring sites indicated.

Figure 1:
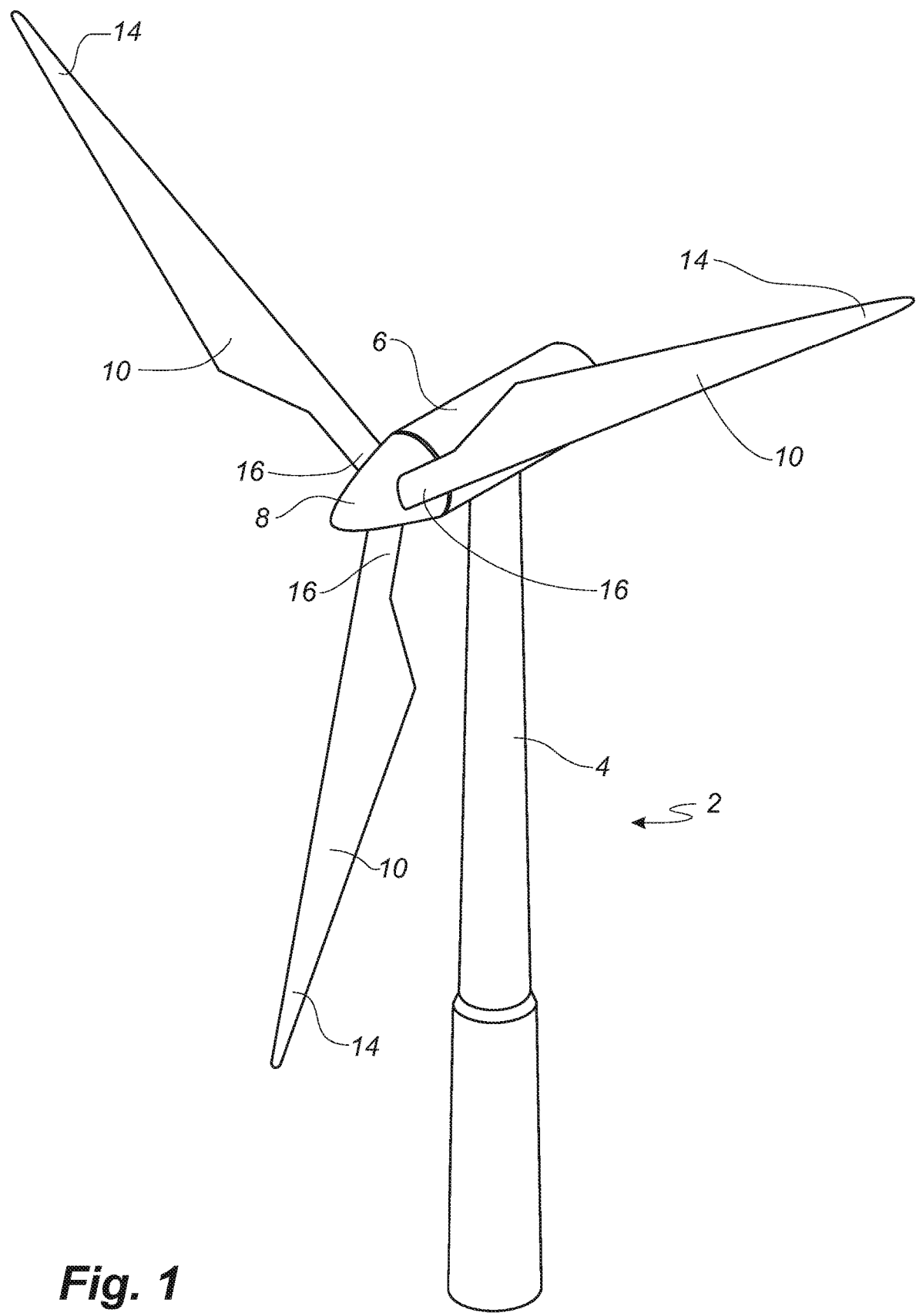

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

An integrated thermoplastic anchoring site 61 for attaching, for example, a spoiler in the transition region 32 is shown. A further integrated site 63 for attaching, for example, noise reducing serrations is indicated at the trailing edge 20 in the airfoil region 34. At the leading edge 18, an attachment site 68 for a second thermoplastic material is shown, thereby completing an erosion shield. It is seen that the erosion shield may extend around the tip of the blade.

It is clear that the blade can have more or fewer attachment sites than the three shown on FIG. 2.

The attachments sites are integrated in the wind turbine blade during manufacturing of the blade. This integration may be achieved by placing a thermoplastic material in the mould for the blade body shell or parts of the blade body shell so that the thermoplastic material is facing the outer surface of the final blade, as indicated on FIG. 2. Different attachment sites may comprise the same or different thermoplastic materials. For example, attachment site 68 may be poly (acrylonitrile butadiene styrene) while attachment sites 61 and 63 are polycarbonate or all attachment sites are poly (acrylonitrile butadiene styrene).

Figure 3:
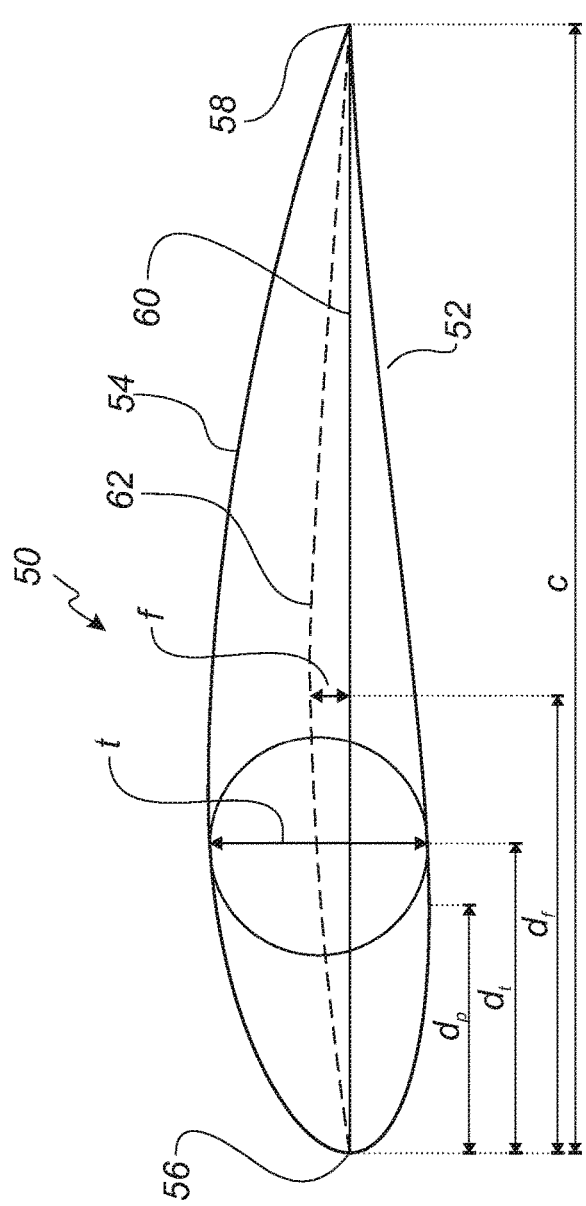
Figure 4:
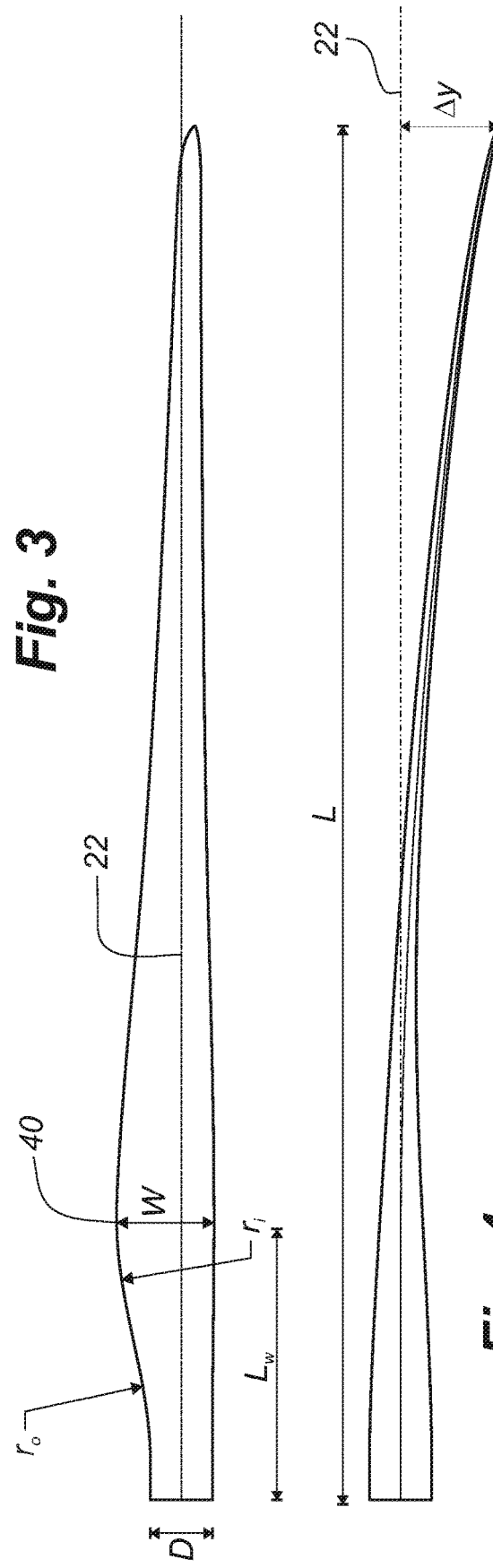

FIGS. 3 and 4 depict parameters, which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c. Thus, a local relative blade thickness t/c is given as the ratio between the local maximum thickness t and the local chord length c. Further, the position dp of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=Lw, and has a shoulder width W, which equals the chord length at the shoulder 40. The diameter of the root is defined as D. The curvature of the trailing edge of the blade in the transition region may be defined by two parameters, viz. a minimum outer curvature radius ro and a minimum inner curvature radius ri, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as $\Delta y$, which corresponds to the out of plane deflection from a pitch axis 22 of the blade.

FIG. 5 shows a schematic view of an airfoil profile having an erosion shield 64 comprised of two layers, one layer of a first thermoplastic material 65 and a second layer of a second thermoplastic material 66 at the leading edge. The erosion shield is situated in a recess 67 in the blade and it is indicated that the outer surface of the erosion shield is flush with the surface of the shell body.

The leading edge is not strictly defined as a narrow edge but is indicated to extend to both suction side and pressure side of the airfoil. The leading edge is broadly understood as the part of the blade cutting through the air during rotation of the rotor of the wind turbine, this part of the blade thereby being most vulnerable towards erosion.

FIG. 6 shows a schematic view of an airfoil profile of two shell body parts having an integrated first thermoplastic material 65 in a recess 67 at the leading edge. The first thermoplastic material acts as a site for attachment of a second thermoplastic material, the second thermoplastic material completing an erosion shield at the leading edge of the blade. The completed erosion shield corresponds to the shield 64 shown in FIG. 5.

FIG. 7 shows a schematic view of an erosion shield comprised of 2 layers, one layer of a first thermoplastic material 65 and a second layer of a second thermoplastic material 66 joined together. Such a pre-fabricated erosion shield may be integrated in the shell body to provide a complete leading edge protection. The two layers in the erosion shield are preferably joined by plastic welding. In particular laser welding is a preferred method of joining the 2 layers of thermoplastic material. The first thermoplastic material 65 and the second thermoplastic material 66 are brought into close contact and a laser is used to melt the second thermoplastic material and the first thermoplastic material at the interface between the two materials whereby a bond is established between the two materials.

It may be beneficial to pre-fabricate such two-layer erosion shield before integration with the shell body, because the joining of the two thermoplastic materials in some embodiments may be more conveniently done before integration with the shell body, for example, by placing the pre-fabricated erosion shield or part of a pre-fabricated erosion shield in a mould to form the shell body or a part thereof.

FIG. 8 shows a schematic view of pre-formed parts of a first 65—and a second 66 thermoplastic material, respectively. Typically, the pre-formed part of the first thermoplastic material 65 is placed in the mould when moulding the shell body or part of the shell body of the wind turbine blade. The pre-formed part of the second thermoplastic material is then attached to the pre-formed part of the first thermoplastic material post-moulding to complete an erosion shield at the leading edge of the blade. When using pre-formed parts, both the correct placement of the pre-formed part of the first thermoplastic material in the mould and correct attachment of the second part post moulding may be easier compared to using flexible thermoplastic foils or sheets, because the pre-formed parts, due to narrow tolerances achievable during their manufacturing, are relatively easy to handle and fit together nicely when attached to one another.

The pre-formed part of the first thermoplastic material shown here is applicable in a one-shot moulding process. It should be understood that, if, for example, the blade is formed from two shell body parts (see FIG. 6), the pre-formed part of the first thermoplastic material may also constitute two pre-formed parts, one to be placed in a first mould for moulding a first shell body part and another to be placed in a second mould for a second shell body part.

FIG. 9 shows a schematic view of two sheets/foils of a first 65—and a second 66 thermoplastic material, respectively. Flexible sheets or foils may be advantageous to use according to these embodiments, to form an erosion shield. The sheet/foil of the first thermoplastic material may be placed in the mould together with fibre material. The sheet/foil may be flexible enough to follow the contour of the mould surface, especially when subjected to the weight of fibre plies or pre-preg material placed on top of the sheet/foil of first thermoplastic material. The vacuum applied when resin is injected may also help to fix the sheet/foil of first thermoplastic material in the mould.

After moulding of the shell body, now comprising the first thermoplastic material exposed to the outer surface of the shell at the leading edge, the sheet/foil of the second thermoplastic material is attached on top of the first thermoplastic material. By choosing suitable thermoplastic materials, as explained above, it may be possible to attach the second thermoplastic material by plastic welding, such as laser welding.

In a service situation, where the second thermoplastic material has been eroded from the erosion shield of the wind turbine blade, exposing the first thermoplastic material at the outer surface of the leading edge of the blade, the repair of the erosion shield may be done on-site by welding a new sheet/foil of the second thermoplastic material to the first thermoplastic material. If, for example, laser welding is used, the attachment process is more or less independent of the environmental conditions at the site of repair (temperature, humidity etc.).

The repair can of course be performed with pre-formed parts of the second thermoplastic material as well.

FIG. 10 shows a schematic view of a pre-formed part of thermoplastic material, the part being thinner at the ends than in the middle. Such a part may be advantageous if no recess is available at the leading edge. A first such part of the first thermoplastic material may be integrated in the shell body of the blade in the moulding process, as previously explained, and a second such part of the second thermoplastic material may be attached to the first part after moulding. The geometry having the thinner ends allows the resulting erosion shield to be substantially flush with the surface of the airfoil, even without a recess in the shell body, whereby aerodynamic disturbances from the erosion shield may be minimized.

FIG. 11 shows a schematic view of an airfoil profile corresponding to the joining of the two shell body parts of FIG. 5.

The recess 67 at the leading edge may accommodate a second thermoplastic material (not shown) on top of the shown integrated first thermoplastic material 65 and attached to the first thermoplastic material 65, for example by plastic welding. The second thermoplastic material may be in the form of a sheet or foil as shown in FIG. 9 or a pre-formed part as shown in FIG. 8.

It may also be possible to attach a pre-formed sandwich part (see FIG. 7) already comprising a layer of a first—and a layer of a second thermoplastic material to the thermoplastic material in the recess, whereby a three-layer erosion shield may be formed.

FIG. 12 shows a schematic view of a wind turbine blade with an erosion shield 69, and further surface mounted devices, serrations 71 and a spoiler 73, attached to the blade of FIG. 2 at the sites for attachment shown in FIG. 2. Attaching such add-ons or surface mounted devices via the sites of attachment integrated in the shell body may be performed by using adhesive. The adhesive may be chosen to provide better bond strength than can be achieved by gluing surface mounted devices to the shell body without having the dedicated sites for attachment. Other methods of attachment may be used, such as plastic welding. It is only possible to use plastic welding if both the sites of attachment and the surface mounted devices are made of thermoplastic material. Due to the integration of the anchoring sites for attachment in the shell body, a superior attachment of the surface mounted devices may be achieved when compared to attaching surface mounted devices directly to the fibre reinforced material of a shell body for a wind turbine blade, for example, by using double-sided tape, because the material used for providing the anchoring site may be selected for optimal bonding, while fibre reinforced material typically is selected to provide stiffness and to resist stresses induced in the blade when subjected to different forces during rotation when mounted on the wind turbine.

Accordingly, any add-ons suitable for attachment to thermoplastic sites of attachment may be used according to embodiments of the invention. Vortex generators (not shown), for example, may be made of thermoplastic material and attached to suitably placed sites of attachment.

| List of reference numerals | |
|---|---|
| 2 | wind turbine |
| 4 | tower |
| 6 | nacelle |
| 8 | hub |
| 10 | blade |
| 14 | blade tip |
| 16 | blade root |
| 18 | leading edge |
| 20 | trailing edge |
| 22 | pitch axis |
| 30 | root region |
| 32 | transition region |
| 34 | airfoil region |
| 41 | first airfoil profile |
| 42 | second airfoil profile |
| 43 | third airfoil profile |
| 44 | fourth airfoil profile |
| 45 | fifth airfoil profile |
| 46 | sixth airfoil profile |
| 50 | airfoil profile |
| 52 | pressure side |
| 54 | suction side |
| 56 | leading edge |
| 58 | trailing edge |
| 60 | chord |
| 61 | thermoplastic anchoring site in transition region |
| 62 | camber line/median line |
| 63 | thermoplastic anchoring site at trailing edge |
| 64 | erosion shield |
| 65 | a first thermoplastic material |
| 66 | a second thermoplastic material |
| 67 | recess |
| 68 | thermoplastic anchoring site at leading edge |
| 69 | second erosion shield |
| 71 | surface mounted device, serrations |
| 73 | surface mounted device, spoiler |
| c | chord length |
| $d_t$ | position of maximum thickness |
| $d_f$ | position of maximum camber |
| $d_p$ | position of maximu pressure side camber |
| f | camber |
| L | blade length |
| P | power output |
| r | local radius, radial distance from blade root |
| t | thickness |
| vw | wind speed |
| □ | twist, pitch |
| Δy | prebend |

The invention claimed is:

1. A wind turbine blade having a blade shell body made of a composite material, said composite material comprising reinforcement fibers and a thermoset resin, said wind turbine blade comprising a tip end, a root end, a leading edge and a trailing edge, said wind turbine blade comprising:
   a thermoplastic material integrated in the blade shell body in at least a part of an outer surface of the wind turbine blade; and
   at least one surface mounted device attached to an anchoring site of the wind turbine blade, the anchoring site comprising said thermoplastic material.

2. The wind turbine blade according to claim 1, wherein the thermoplastic material comprises chemical groups capable of reacting with components of the thermoset resin.

3. The wind turbine blade according to claim 1, wherein said at least one surface mounted device part is attached to the wind turbine blade at said anchoring site by gluing, plastic welding or a combination thereof.

4. The wind turbine blade according to claim 3, wherein said plastic welding is selected from the group consisting of laser welding, thermal welding, ultrasonic welding, high frequency welding and solvent welding.

5. The wind turbine blade according to claim 3, wherein said plastic welding comprises a thermal welding process selected from the group consisting of hot gas welding, speed tip welding, spot welding, contact welding and hot plate welding.

6. The wind turbine blade according to claim 1, wherein the thermoplastic material is provided in the form of sheets, foils or strips.

7. The wind turbine blade according to claim 6, wherein the thermoplastic material has a thickness of between 0.1 and 2.0 mm.

8. The wind turbine blade according to claim 7, wherein the thermoplastic material has a thickness between 0.2 mm and 1.0 mm.

9. The wind turbine blade according to claim 1, wherein the at least one surface mounted device is a part having serrations, a spoiler, a vortex generator, a winglet, a tip section, a Guerney flap, a stall fence, or any combinations thereof.

10. The wind turbine blade according to claim 1, wherein the at least one surface mounted device is an injection moulded plastic part.

11. The wind turbine blade according to claim 1, wherein the thermoplastic material is selected from the group consisting of polystyrene, poly(acrylonitrile butadiene styrene), poly(acrylonitrile styrene acrylate), poly(styrene acrylonitrile), polycarbonate, polyether ether ketone, polybutylene terephthalate or any combination thereof.

12. The wind turbine blade according to claim 1, wherein the at least one surface mounted device is made of polystyrene, poly(acrylonitrile butadiene styrene), poly(acrylonitrile styrene acrylate), poly(styrene acrylonitrile), polycarbonate, polyether ether ketone, polybutylene terephthalate, ultra-high density polyethylene, thermoplastic elastomer, such as thermoplastic polyurethane or any combination thereof.

13. The wind turbine blade according to claim 1, wherein the thermoplastic material is selected from the group consisting of poly(acrylonitrile butadiene styrene), polycarbonate, blends of poly(acrylonitrile butadiene styrene) and polycarbonate, and combinations thereof and the at least one surface mounted device is made of polycarbonate, blends of poly(acrylonitrile butadiene styrene) and polycarbonate, thermoplastic polyurethane and combinations thereof.

14. The wind turbine blade according to claim 1, wherein a recess is present on top of the thermoplastic material, said recess having a depth adapted for accommodation of the at least one surface mounted device, whereby the base part of the at least one surface mounted device on the surface of the wind turbine blade is substantially flush with the adjacent surface of the wind turbine blade.

15. A wind turbine comprising a wind turbine blade according to claim 1.

16. A method of manufacturing a wind turbine blade, said wind turbine blade having a blade shell body made of a composite material in a moulding process, said composite material comprising reinforcement fibers and a thermoset resin, said wind turbine blade comprising a tip end, a root end, a leading edge and a trailing edge, said method comprising the steps of;

placing a thermoplastic material in a mould for moulding at least a part of the blade shell body, said thermoplastic material being placed in the mould to form an anchoring site integrated at the surface of the blade shell body;

placing reinforcement fibers in the mould;

wetting the thermoplastic material and the reinforcement fibers with a thermoset resin;

curing said resin to form at least a part of the shell body; and attaching at least one additional surface mounted device at the anchoring site.

17. The method according to claim 16, wherein said at east one additional surface mounted device is attached by gluing, plastic welding or a combination thereof.

18. The method according to claim 16, wherein said attaching the at least one additional surface mounted device is performed on site while the wind turbine blade is mounted on a wind turbine or the wind turbine blade has been detached from the wind turbine for servicing.

19. The method of manufacturing a wind turbine blade according to claim 16, wherein the at least a part of the shell body comprises a plurality of parts of the shell body, the method of manufacturing a wind turbine blade further comprising the step of joining the plurality of parts of the shell body to form the blade shell body.

* * * * *